United States Patent [19]

Steinbach

[11] Patent Number: 4,878,979
[45] Date of Patent: Nov. 7, 1989

[54] METHOD OF REUSABLY SEALING A SILICONE RUBBER VACUUM BAG TO A MOLD FOR COMPOSITE MANUFACTURE

[75] Inventor: John Steinbach, Milford, Conn.

[73] Assignee: United Technologies Corporation, Hartford, Conn.

[21] Appl. No.: 855,980

[22] Filed: Apr. 25, 1986

[51] Int. Cl.⁴ .................. B29C 43/12; B32B 31/00
[52] U.S. Cl. ........................... 156/285; 156/306.6; 156/344; 264/219; 264/316
[58] Field of Search ............ 264/219, 313, 316, 324, 264/510, 511, 571; 156/285, 306.6, 306.9, 286, 299, 300, 344, 382; 425/389

[56] References Cited

U.S. PATENT DOCUMENTS

| | | | |
|---|---|---|---|
| 2,441,097 | 5/1948 | Hicks | 264/316 X |
| 3,334,383 | 8/1967 | Irvine | 425/389 |
| 3,575,756 | 4/1971 | Maus | 156/286 X |
| 4,065,340 | 12/1977 | Dickerson | 264/511 X |
| 4,562,033 | 12/1985 | Johnson et al. | 264/510 |

FOREIGN PATENT DOCUMENTS 2145762  3/1973  Fed. Rep. of Germany ...... 264/219

Primary Examiner—Jeffery Thurlow
Assistant Examiner—Leo B. Tentoni
Attorney, Agent, or Firm—Edward L. Kockey, Jr.

[57] ABSTRACT

A silicone rubber vacuum bag for use in composite article manufacture is reusably sealed to a mold, without mechanical clamping means. The mold-mating portion of the bag is primed with a silicone rubber adhesive, which is cured thereto, and a layer of semiadhesive sealer is applied between the primed mold-mating portion of the bag and the mold.

1 Claim, 1 Drawing Sheet

METHOD OF REUSABLY SEALING A SILICONE RUBBER VACUUM BAG TO A MOLD FOR COMPOSITE MANUFACTURE

The invention described herein was made in the performance of work under NASA Contract No. NAS2-11771 and is subject to the provisions of Section 305 of the National Aeronautics and Space Act of 1958 (72 Stat. 435; 42 U.S.C. 2457).

BACKGROUND OF THE INVENTION

A typical composite manufacturing process involves superimposing many layers of a fibrous loadbearing material (such as Fiberglas®, Kevlar® or graphite fibers) onto a mold, impregnating the fibrous material with a bonding agent (such as epoxy), applying moderate pressure to the layup in the direction of the mold, and curing the resulting composite article at an elevated temperature.

One technique for applying pressure to the uncured composite article is to provide mating molds that sandwich the composite article therebetween, under mechanically-applied pressure.

Another technique for applying pressure to the uncured composite article, in the case of a single mold, is placing an airtight bag over the composite article, sealing the bag to the mold, and evacuating the bag. The surrounding atmosphere provides the applied pressure to the uncured composite article via the bag.

Silicone rubber vacuum bags have proven durable, but involve mechanically sealing the bag perimeter to the mold. Thus it has been known to use disposable bags (such as made from nylon) and to effect the bag perimeter to mold seal by inserting a semiadhesive sealer strip (such as Presstite®) therebetween. Presstite is a high temperature, medium pressure sealing agent. However, Pressite strips are not compatible with silicone rubber.

DISCLOSURE OF THE INVENTION

According to the invention a silicone rubber vacuum bag for use in composite article manufacture is reusably sealed to a mold, without mechanical clamping means.

The mold-mating portion of the bag is primed with a silicone rubber adhesive, which is cured thereto, and a semiadhesive sealer strip is applied between the primed mold-mating portion of the bag and the mold.

Other objects, features, and advantages of the invention will become apparent in light of the following description thereof.

BEST MODE FOR CARRYING OUT THE INVENTION

Figure 1:
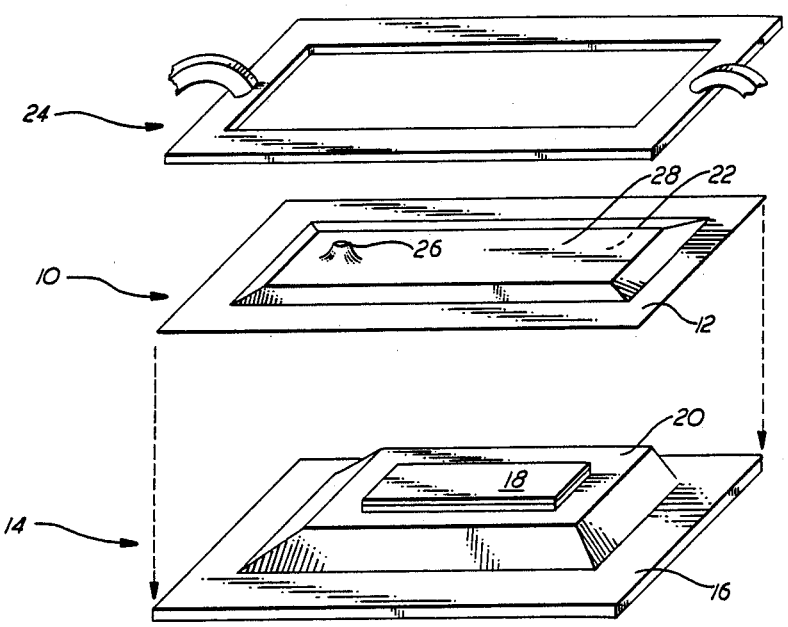
FIG. 1 is a perspective view of a prior art method of sealing a silicon rubber vacuum bag to a mold.

FIG. 1 shows a prior art silicone rubber vacuum bag 10. The bag is generally planar, and has a perimeter portion (flange) 12. A mold 14 has a perimeter portion 16 corresponding in size and shape to the bag perimeter portion 12. A composite layup 18 comprising many layers of a fibrous load-bearing material and a bonding resin is applied to the upper surface 20 of the mold which may, for instance, have a concavity or convexity defining the ultimate shape of the composite article.

The bag 10 is then fitted over the mold 14 so that its inner surface 22 is juxtaposed with the composite layup 18 and so that its perimeter portion 12 mates with the perimeter portion 16 of the mold. Suitable clamping means 24 such as a cam-operated frame are then employed to effect an airtight seal between the bag perimeter portion 12 and the mold perimeter portion 16. The bag 10 is then evacuated via a nipple 26 disposed in its outer surface 28 so that the surrounding atmosphere exerts a force upon the uncured composite article 18 via the bag 10 to press it against the mold 14. The entire assembly may then be heated to cure the composite article. Finally, the bag and article are removed from the mold.

Figure 2:
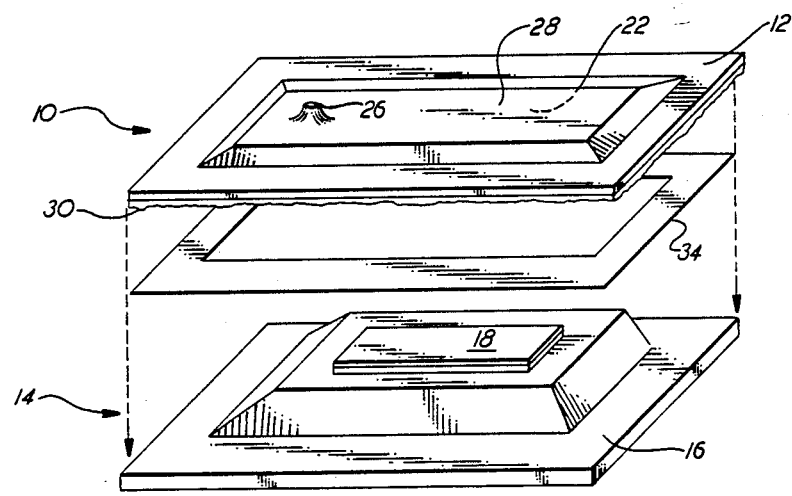
FIG. 2 is a perspective view of the method of sealing a silicon rubber vacuum bag to a mold of this invention.

FIG. 2 illustrates the method of reusably sealing the silicone rubber vacuum bag 10 to the mold 14 of this invention. The inner surface of the mold-mating flange 12 is primed with a silicone rubber adhesive 30, such as Dapcotac 3300® Contact Cement (available from Aircraft Products Co., Anaheim, CA).

Dapcotac 3300 Contact Cement is a silicone rubber adhesive intended for bonding cured silicone rubber stock to itself, to metal, glass and many plastic surfaces. As is usual with contact cements, it is applied to both surfaces and allowed to air dry prior to joining the surfaces. As employed in the present invention, the Dapcotac 3300 is applied to one surface (the bag 10) only, is not cured prior to use, and does not "bond" to the second surface (in this case, Presstite). The bag/mold seal is effected by interposing a layer 34 of Presstite between the bag perimeter portion 12 and the primed mold perimeter portion 16. After the composite article is cured, the bag 10 may be removed from the mold, the Presstite peeled off from the bag, and the bag reused. It has been found that the first composite curing cycle also cures the Dapcotac 3300, which normally takes 7 days at 77° F., 50% RH to air cure. The bag may be used up to five times with a single application of the Dapcotac 3300, after which it is freshly primed.

We claim:

1. A method of reusably sealing a silicone rubber vacuum bag to a mold, comprising:
    priming the mold-mating portion of the vacuum bag with a silicone rubber adhesive;
    applying a layer of semiadhesive sealer between the primed mold-mating portion of the vacuum bag and the mold;
    temporarily securing the primed portion of the silicone rubber vacuum bag to the layer of semiadhesive material and to the mold;
    applying vacuum to the mold;
    releasing the vacuum;
    removing the bag from the mold;
    peeling the semiadhesive material from the primed portion of the silicone rubber bag; and
    reusing the bag a plurality of times before reapplying additional silicone rubber adhesive to the mold-mating portion of the silicone rubber bag.

* * * * *